July 14, 1970     G. F. KELK ET AL     3,520,182

LOAD CELLS

Filed June 5, 1967                                          5 Sheets-Sheet 1

INVENTORS
GEORGE F. KELK
ANDREJS ZELTKALNS

BY *Cavanagh & Norman*

July 14, 1970　　　G. F. KELK ET AL　　　3,520,182
LOAD CELLS
Filed June 5, 1967　　　　　　　　　5 Sheets-Sheet
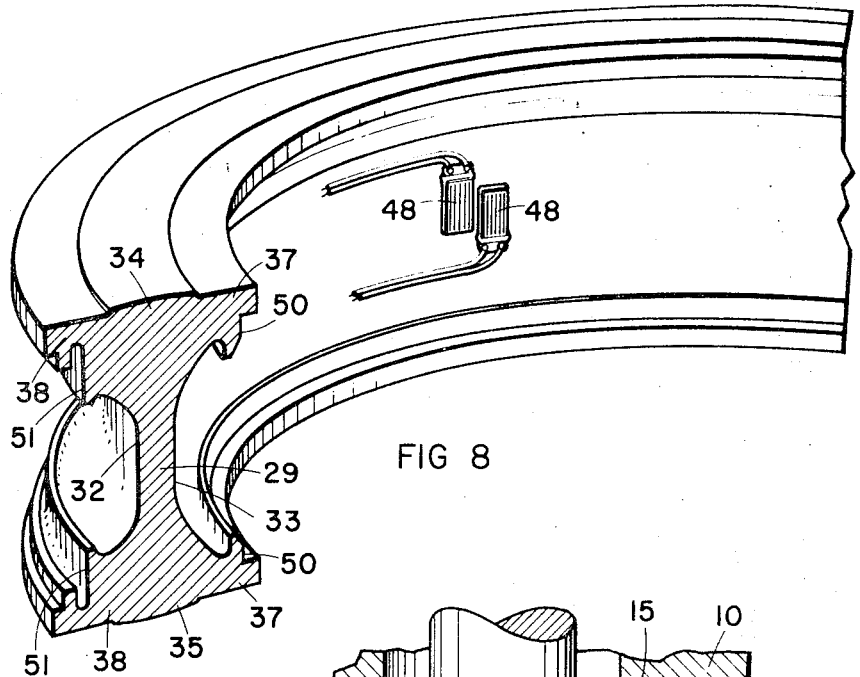
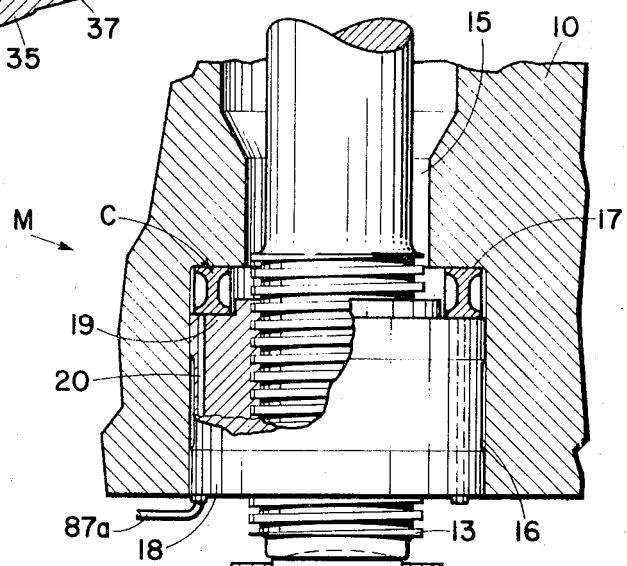
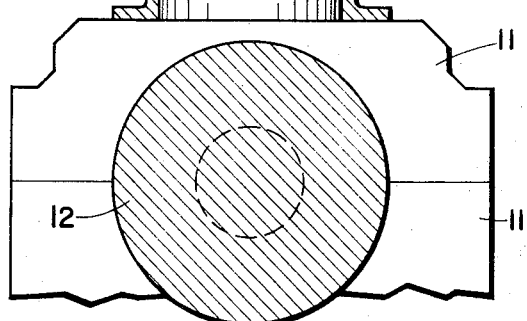
INVENTORS
GEORGE F. KELK
ANDREJS ZELTKALNS
BY Cavanagh & Norman

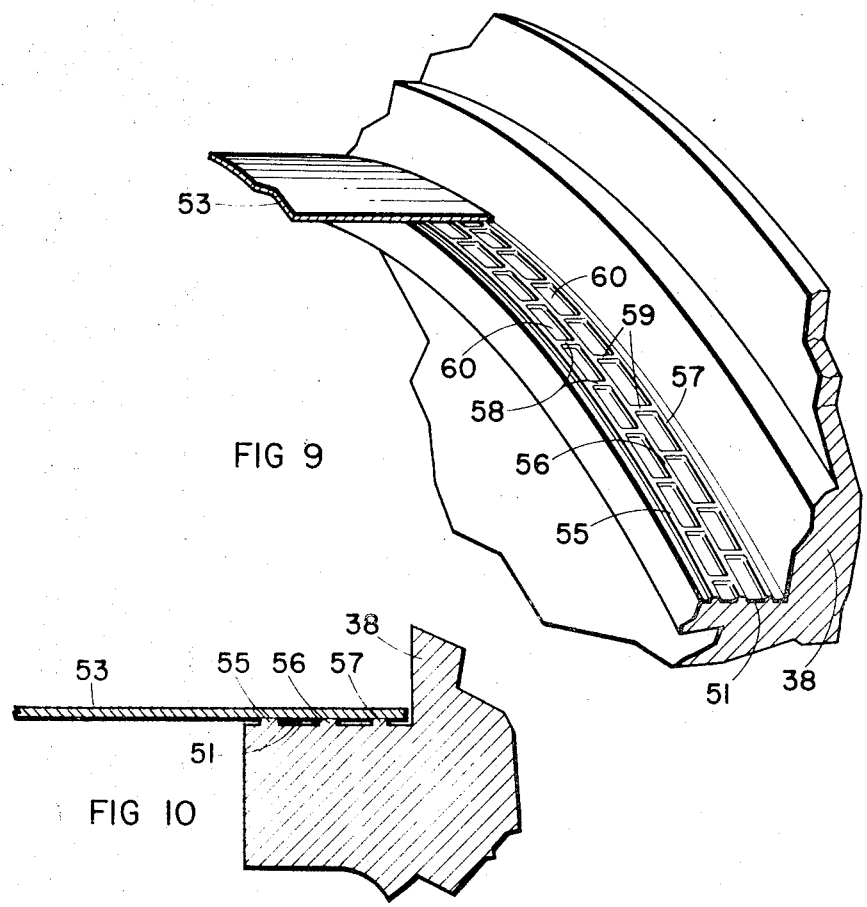
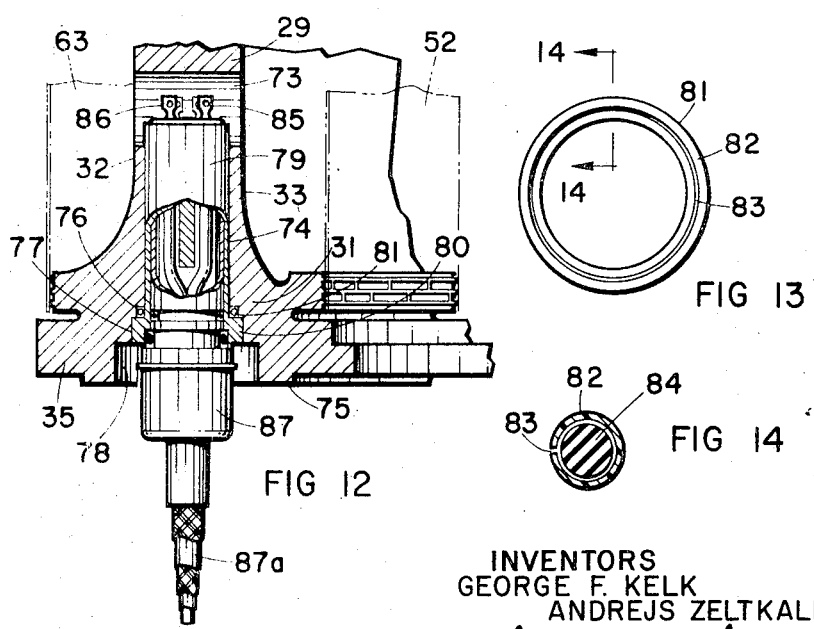

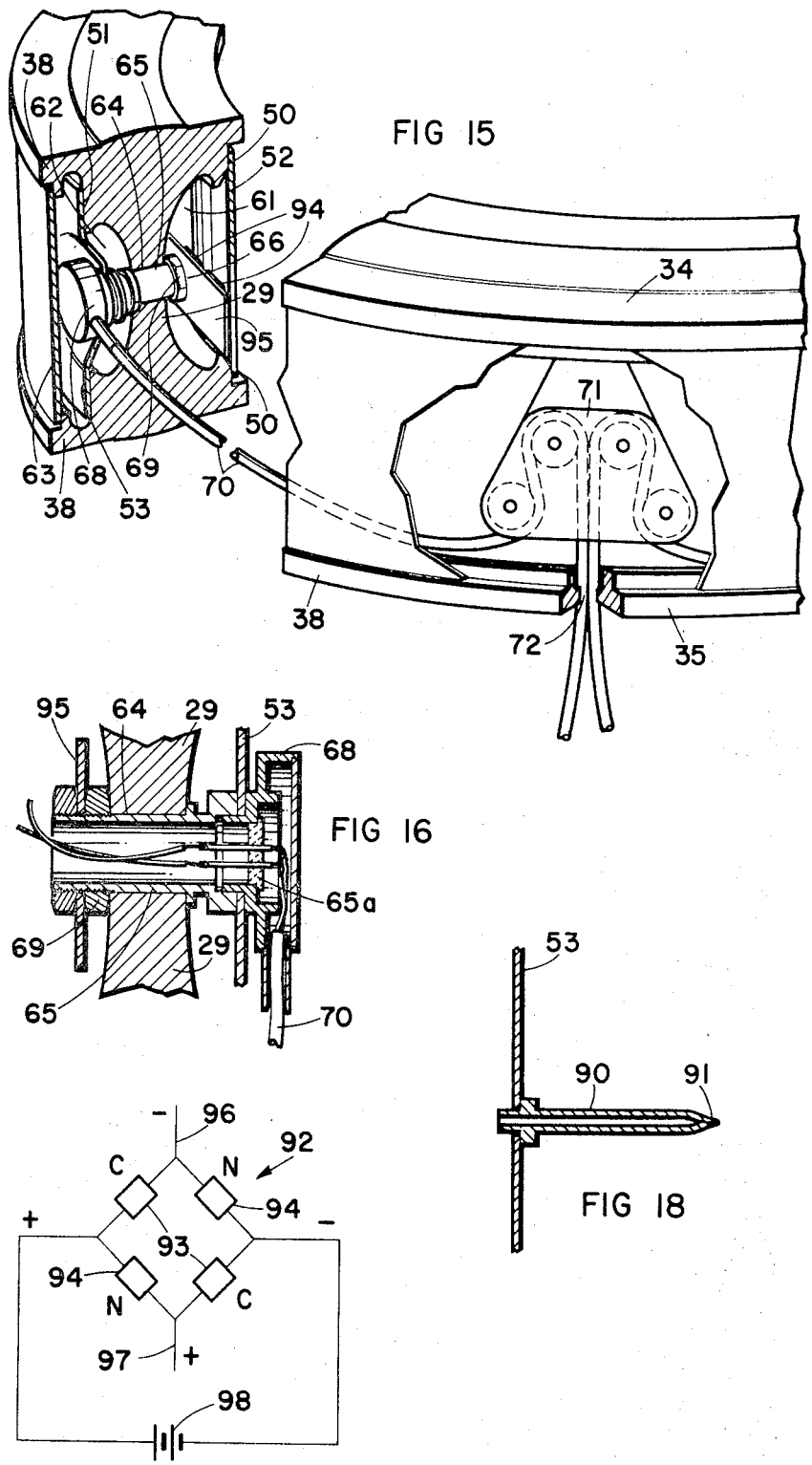

3,520,182
LOAD CELLS
George F. Kelk, Willowdale, Ontario, and Andrejs Zeltkalns, Don Mills, Ontario, Canada, assignors to George Kelk Limited, Don Mills, Ontario, Canada
Filed June 5, 1967, Ser. No. 643,648
Int. Cl. G01l 1/22
U.S. Cl. 73—141
8 Claims

ABSTRACT OF THE DISCLOSURE

A load cell employed in rolling mills to measure the load to which certain machine parts are subject. The cell includes an annular column of non-mirror symmetry in vertical section having a sensing region and a load pad integrally joined to each end thereof. The inner and outer faces of the column carry compression strain gauges responsive to strains on the column. The column is structurally designed to provide effective decoupling of effects of differential mass translation under load to improve linearity and to reduce the effects of friction and hysteresis in cell output readings to a negligible order of magnitude.

---

This invention relates to a load cell of the ring type having a columnar web including a load sensing region responsive to axial load and load pads or rings at the ends of said web.

A load cell of the general kind referred to herein is described in U.S. Pat. 3,132,547 issued May 12, 1964 in which the web is of vertical section mirror image symmetrical shape in its inner and outer surfaces. The use of tangential tension strain gauges on the inner and outer mid-regions of such surfaces of the prior art renders a high sensitivity not only to load applying to the load pads or flanges but to friction effects, misalignment of loading and especially hysteresis and non-linearity of measurement response.

This invention recognizes that a ring structure of I shaped cross section under compressive axial load will migrate or distort radially outwardly in the web or columnar portion to a greater degree than the load pads or flange portions due to peculiar characteristics of behavior of ring structures so shaped and explainable by application of Poisson's Law. Such differential mass translations observable as distortions or strains under load give rise to bending moments in the web column and sensing region thereof whereby the measurement of inner and outer strains differs, leading to non-linearity and undue sensitivity to friction giving rise to substantial hysteresis effects in measurements obtained.

It is accordingly a main object of this invention to provide a load cell of the general class referred to adapted by its structural form to obviate conditions giving rise to changing bending moments in the sensing column portion during loading and unloading and hence of lesser sensitivity to friction and hysteresis effects.

It is another object of the invention to provide a load cell characterized by a high degree of linearity in its response to load.

It is a further object of the invention to provide a load cell in which the columnar sensing portion is joined to the load pads by a bending moment decoupling portion compensating for bending stresses derived from differential movement of the sensing region and pads under load.

It is a further object of the invention to provide a load cell embodying a hinge portion connecting the columnar sensing region to the load pads to absorb loading misalignments.

It is a further object of the invention to provide a load cell embodying compression strain gauges on surfaces of the sensing region for the measurement of load at a sufficient sensitivity and improved linearity giving rise to greater overall accuracy than heretofore and a reduced sensitivity to friction effects on the load pads.

It is a further object of the invention to provide a load cell which is hermetically sealed and compensated in its measurements for environmental changes.

With the foregoing and other objects in view the invention generally concerns the improvement in a load cell of the annular ring type of the combination of: a column having a sensing region; a load pad at each end of said column; and a decoupling portion of said column joining each end of said sensing region to a load pad, each of said decoupling portions being distributed in its mass to compensate for bending moments in the sensing region and providing thereby, equal vertical strains at the inner and outer surfaces of the sensing region responsive to compressive loading on said pads.

Various other more detailed objects and advantages of the invention will in part become apparent and in part be hereinafter stated as the description of the invention proceeds.

For a full and more complete understanding of the invention reference may be had to the following description and accompanying drawings wherein:

FIG. 7 is a section through a portion of a rolling mill in which a load cell of this invention is installed;

FIG. 8 is a perspective of a portion of a load cell designed in accordance with the precepts of this invention with parts broken away and other parts omitted;

FIG. 9 is a detailed perspective on an enlarged scale depicting the welded joint between an edge of one band and a load pad;

FIG. 10 is a detailed section on an enlarged scale of the welded joint between a band edge portion and a load pad;

FIG. 12 is a detailed section through a portion of the column and a load pad depicting one arrangement for taking the wiring out of the cell through a load face;

FIG. 13 is a detailed elevation of an O-ring used in the embodiment of FIG. 12;

FIG. 14 is a section on an enlarged scale of the O-ring of FIG. 13, being taken about on the plane represented by the line 14—14 of FIG. 13;

FIG. 15 is a perspective of one embodiment with parts broken away and shown in section;

FIG. 16 is a detailed section on an enlarged scale of a portion of a band and a fitting carried thereby;

FIG. 18 is a section through a portion of a band showing a flushing nozzle secured thereto; and FIG. 19 is an electrical schematic of a strain gauge bridge circuit according to the method of the invention.

Figure 1:
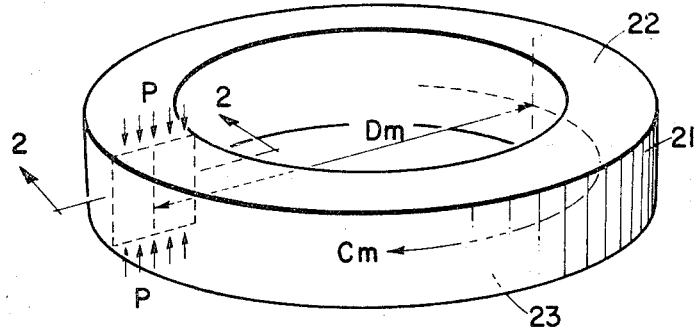
FIG. 1 is a perspective of a solid ring that is referred to in the explanation of certain aspects of the present invention.

To the end of explaining the exact nature of the improvements of the present invention reference is first made to FIG. 7 which depicts a portion of a rolling mill in which a load cell is installed. A rolling mill is identified in its entirety by the reference character m. It includes a frame 10 in which are mounted roll chocks 11. Two of the latter are illustrated as carrying a work roll 12. Load forces are applied to roll 12 by a screw 13 in engagement with a bearing assembly 14. The frame 10 is provided with a screw receiving passage 15 that is counterbored at 16 providing a shoulder 17.

A screw box or nut 18 is received in the counter bore 16 and the screw 13 ise threaded therethrough. The nut 18 is formed on its upper or inner end with a shoulder 19 in confronting spaced relation to the shoulder 17. A load cell which is referred to in its entirety by the reference character C is depicted generally in FIG. 7 and is positioned between the shoulders 17 and 19. It is evident that, as the screw 13 is operated to apply load forces to the roll 12 the shoulders 17 and 19 are urged together and that the load cell C takes these compressive forces. The nut 18 is formed with a passage 20 which accommodates a cable from the cell C as will be later described.

Figure 2:
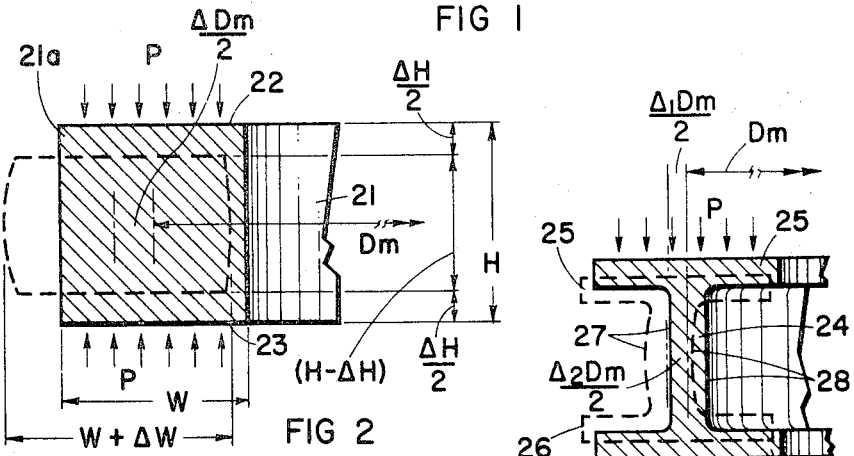
FIG. 2 is a section through a portion of the ring of FIG. 1, being taken about on the plane represented by the line 2—2 of FIG. 1 and on an enlarged scale.
Figure 3:
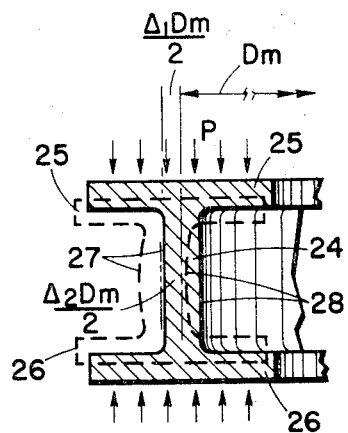
FIG. 3 is a radial section of a ring type load cell of I-shaped cross section of prior art type characterized by mirror image symmetry in vertical section i.e. about the vertical axis.

Referring now to FIGS. 1 to 3 what is known as the "Poisson effect" will be described. A solid ring 21 has opposed load pad faces 22 and 23. When no forces are applied to the faces 22 and 23 the ring 21 has the full line position of FIG. 2. However when heavy load forces are applied as indicated by the arrows P the ring will tend to assume the condition depicted by the broken lines. In this condition both the faces 22 and 23 will have moved radially outwardly. The Poisson Law of constant volume and strain distribution in three dimensions as applied to a cube teaches that vertical compressive strain will effect lateral strain having regard to mass distribution. Thus a reduction in vertical height H by an applied load will cause a transverse increase in width W and length "L." A ring however provides a special case of a fourth dimension wherein the length of the element becomes a mean circumference $Cm$ whereby the diameter suffers a lateral change. Thus mean diameter $Dm$ in FIGS. 1 and 2 suffers an increase to $Dm+\Delta Dm$ while W becomes $W+\Delta W$ and H reduces to $H-\Delta H$. The section 21 is of uniform width W.

Referring now more particularly to FIG. 3 a ring of I shaped cross section is therein illustrated and comprises a central web 24 and end flanges 25 and 26. Under conditions of no load the ring has the full line cross section depicted. However when load forces are applied the ring is distorted into the broken line condition shown. In this condition the flanges 25 and 26 will have moved radially outwardly into the broken line position. The web 24 will also move radially outwardly but it will, at the same time, be distorted into the bowed shape depicted. Originally the outer face 27 of the web 24 is substantially cylindrical but after distiortion it has the convex shape depicted. Similarly the inner surface 28 of the web 24 is cylindrical but under heavy load it assumes the concave form illustrated. The section at flanges 25, 26 subjected to load P will develop therein a stress being a function of the sectional area, the shape, and the load. The sectional area between faces 27, 28 of web 24 however is much smaller resulting in a higher stress and thus higher strain in this region. The diametric strain at flanges 25, 26 is $\Delta 1Dm$ but at web 24 is of larger value $\Delta 2Dm$ such strains being direct functions of the corresponding circumferential strains. Accordingly, the web will bow outwardly due to these conditions of different mass translation under load.

It will be evident that when $\Delta 2Dm$ is not equal to $\Delta 1Dm$ the web 24 will be distorted by bending in the manner indicated in chain lines in FIG. 3. Accordingly the vertical strain on outer surface 27 will be different than the vertical strain on inner surface 28. Such difference will change through the range of loading from zero at zero load to a maximum at maximum load neglecting friction.

Friction will give rise to serious hysteresis effects and nonuniformity of loading. Web 24 of FIG. 3 corresponds to the column portion of a load cell wherein flanges 25, 26 correspond to the load pads thereof. In operation the structure shifts radially under loading as above described whereby the load surfaces of load pads 25, 26 are subject to sliding friction. While lubrication by known means alleviates somewhat the magnitude of error arising therefrom different friction effects on the upper and lower pads at the same instant will directly result in bending stresses in the web in addition to those due to symmetrical geometry above discussed. Friction derived bending stresses being inconsistent generate substantial hysteresis in the operation curve of a mirror image symmetrical ring section of the prior art. The decoupling column portions of the present invention markedly reduce the sensitivity to such conditions.

Figure 4:
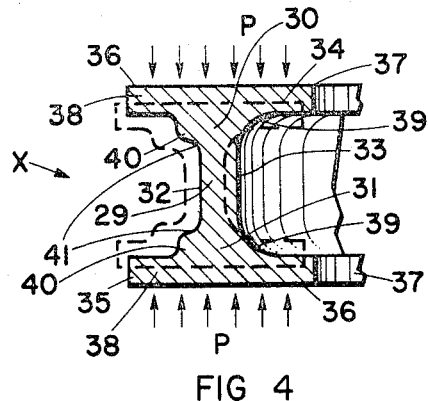
FIG. 4 is a ring section corresponding to FIG. 3 but of a load cell structure according to the invention.
Figure 5:
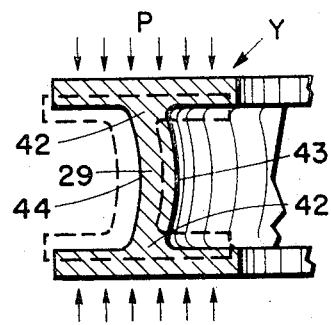
FIG. 5 is a ring section corresponding to FIG. 3 of a modified form of load cell of the invention.
Figure 6:
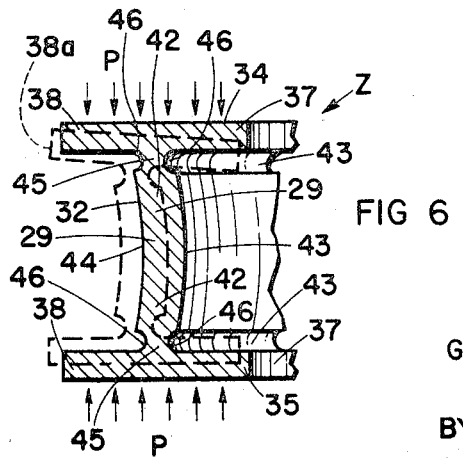
FIG. 6 is a further modified form of section according to the form of the invention disclosed in FIG. 5.

The invention contemplates a decoupling structure for the web indicated in FIGS. 4, 5 and 6. Thus according to the concept herein the web which when radially shifted due to loading at a different rate than the flanges must develop the same bending stress at the outer and inner surfaces 27, 28. Thus the main body X of the load cell of the invention shown in FIG. 4 embodies a central column or web having a sensing region 29 and root portions 30 and 31. Surfaces 32, 33 are adapted to receive strain gauge devices (not shown). The sensing region may be regarded as generally cylindrical throughout the major portion of its extent. Load pads 34 and 35 are integral continuations of bending moment decoupling root portions 30 and 31. Each of the load pads 34 and 35 has an outer load face 36, an inwardly extending radial flange 37 and an outwardly extending radial flange 38. The underside of each flange 37 is joined to the sensing area 33 by a curved surface 39.

The underside of each outer flange 38 terminates at a shoulder 40. Each sensing area 32 is joined to a shoulder 40 by a curved surface 41. The mass distribution of material to form outer surface shoulders 40 defines a non-mirror image vertcial section.

Under conditions of heavy load the cell body X will move from the full line position of FIG. 4 into a condition that is represented to an exaggerated degree by the broken lines. In such a condition the heavier distribution of mass forming outside shoulders 40 develops an eccentricity of loading and thus an opposite bending moment to that derived from the conditions described in FIG. 3. In this way the inner and outer surface strains are maintained equal at all loadings the resulting bending moment in the sensing area being negligible. The effects of differential mass translation are thus decoupled by mass distribution introducing compensating bending moments.

In FIG. 5 the cell Y has root portions 42 of substantially the same thickness as the sensing region 29. They also have inner and outer curved surfaces that blend in with and constitute substantial continuations of the convex inner sensing area 43 and outer concave sensing area 44. Under the load forces of the arrows decoupling is achieved by the eccentricity of the bowed column. Thus the bending moment due to eccentricity derived from this form of mass distribution opposes the bending moment due to the Poisson effect. Therefore, the geometrical cross-sectional shape remains constant during loading and difference in strain is the same on the outside and inside sensing areas and differential mass translation under load is decoupled.

In FIG. 6 a load cell of a modified columnar construction is illustrated and identified as Z. The cell Z includes all the general elements of the cell of FIG. 5 and the elements which are common to the two will be identified by the same reference characters. The essential difference between the cells of FIGS. 5 and 6 resides in the root sections. Each root portion 42 is connected to its load pad 38 by a hinge portion 45 of reduced section defined by at least one inner and/or outer groove 46. These grooves present curved surfaces connecting the sensing areas to the undersides of the flanges 37 and 38. The hinge portion or members 45 are less massive than the root sections 42 and are more highly stressed. Hence distortion under heavy loads is effectively localized in these root sections which therefore do not transmit bending moments derived from misalignment under load to the sensing region 29 as represented by chain lines 38a showing the upper pad tipped in FIG. 6. Thus a cell may include a central web having an inwardly bowed sensing region such as shown at 29 in FIG. 5 and the reduced root sections 42 characterized by hinge members 45 of FIG. 6.

Referring now to FIG. 8 a preferred embodiment of the main body of a load cell will be described. This body follows the general construction of the body X of FIG. 4 and is designed to function on the principles thereof. Thus it comprises a column having a sensing region 29 with inner sensing area 33 and an outer sensing area 32. Vertical compression strain gauges 48 are mounted on the area 33 and similar gauges 49 (FIG. 11) are also mounted on the outer area 32. Load pads 34 and 35 have radially inwardly extending flanges 37 and radially outwardly extending flanges 38.

Each of the flanges 37 is formed on its inner face with an annular cylindrical surface 50 with the two surfaces 50 being in axial alignment. Likewise the flanges 38 are formed with aligned cylindrical surfaces 51. A stainless steel band 52 (FIG. 15) has edge portions welded to the aligned surfaces 50 and another outer band 53 (FIG. 15) has edge portions welded to the aligned surfaces 51.

It is important that the welded joints between each edge portion of each band 51 and 52 and the respective load pad surface be of such a character as to provide a good hermetic seal. One such joint is illustrated in FIGS. 9 and 10 and it will be understood that the other welded joints are of the same character.

The annular surface 51 is shown as formed with a plurality of ridges (in this instance three) which are spaced apart as illustrated. These ridges are identified at 55, 56 and 57. Extending between the ridges 55 and 56 are cross ribs 58. Additional cross ribs 59 extend between ridges 56 and 57. The cross ribs 58 are in staggered relation with respect to the cross ribs 59. These annular ridges 55, 56 and 57 and cross ribs 58 and 59 define pockets 60.

The construction above described obtains before the welding operation. After completion the weld seals off the pockets 60. It is evident that if a failure should occur at any point in one ridge the remaining ridges constitute a bar to any impurity getting through the staggered grid type welded joint. The staggered relation of the cross ribs 58 and 59 limits the migration of a break or weld imperfection while maintaining a seal in such event. The welded joints are achieved by electrodes in the form of rollers. It is evident that, at the time of the welding operation only the ridges and ribs engage the band. This minimizes the chilling of the band at the welding face and results in a highly efficient welded seal.

FIG. 15 illustrates the chambers that are formed on the two sides of the column. Thus the inner chamber 61 is defined by the column, load pads and hermetically sealed band 52 while outer chamber 62 is formed by the column, load pads and hermetically sealed band 53. It is also desirable to provide an outer protective band 63 which ordinarily will be of heavy metal and secured to the outer flanges 38 of the load pads in any preferred manner. There is no need of a hermetic seal between the band 63 and the load pads.

The sensing region 29 of the column is formed with a transverse aperture 64 as depicted in FIG. 15. A fitting 65 is received in this aperture with a sealing fit. The inner end 66 of the fitting 65 accommodate cables coming from the gauges 48 on the inner sensing area 33. These cables pass through the fitting 65 and glass seal insulator 65a to a banjo fitting 66 (FIG. 16) on the outer end of the fitting 65. The outer band 53 is formed with a hole which receives the fitting 65 with a hermetic seal established by the head 68 and nut 69. Wiring from the gauges 49 on the outer sensing area collects in a cable 70 which also embraces cable 67. The aperture 64, fitting 65 and associated devices are included at two diametrically opposed positions in the column. The cables 70 from both heads 68 are joined at a collector plate 71 mounted on the load pad 34 and pass through a passage 72 formed in the flange 38 of load pad 35, opening onto the load face thereof. From the passage 72 the cable 70 passes through passage 20 in nut 18 FIG. 7 to indicators or automatic controls.

Figure 11:
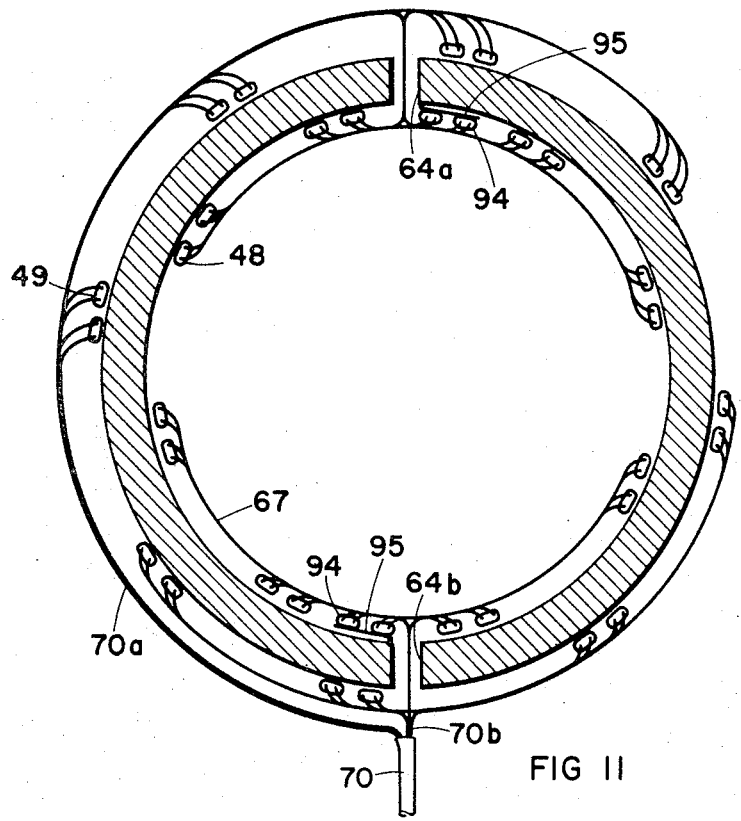
FIG. 11 is a diagrammatic view illustrating the wiring arrangement for connecting the strain gauges on the sensing areas.

Also referring to FIG. 11 it will be observed that the connection array is such as to eliminate induced current and magnetic field effects. Thus the circuit lead lines and return lines proceed through the same hole. The inner gauges or sensing elements are divided into two opposing sets as are the outer sensing elements. The lead and return lines for one corresponding inner and outer set run together i.e. the upper sets are collected in exterior cable 70a through hole 64a and the lower sets are collected in cable 70b through hole 64b to both collect in cable 70.

Referring now to FIG. 12 a slightly modified arrangement for conducting the wiring from the gauges out through a load face of the load pad 35 will be described. The sensing region 29 is formed with an aperture 73. A passage 74, normal to and communicating with aperture 73, extends down through sensing region 29, root section 31 and load pad 35 to the load face 75 onto which it opens. The passage 74 is counterbored to provide a shoulder at 76 and further enlarged at 77 and 78. A cable casing 79 is snugly received in the passage 74. The ring 79 has a flange 80 opposite to the shoulder 76. An O-ring 81 is positioned in the counterbore between shoulder 76 and flange 80 to provide an hermetic seal between the casing 79 and the load pad. The O-ring 81 is of the composite construction illustrated in FIGS. 13 and 14. Thus it comprises a shell 82 of Teflon that is split at 83 and filled with a rubber core 84. The flange 80 is received in the enlargement 77 and held therein in any preferred manner. The Teflon shell accommodates the rotation and compression of the O-ring is made possible by its split construction and the rubber core.

The casing 79 houses two sets of cables. One set is joined at terminals 85 and the other set at terminals 86. Wiring from one set of gauges is connected to the terminals 85 and wiring from the other set to terminals 86. The cables pass through casing 79 and casing cap 87 and thence to passage 20 in nut 18.

The load face 71 of each load pad 34 and 35 may be slightly convexed to overcome in part any misalignment of the load cell between the load faces 75 and the shoulders 17 and 19.

Figure 17:
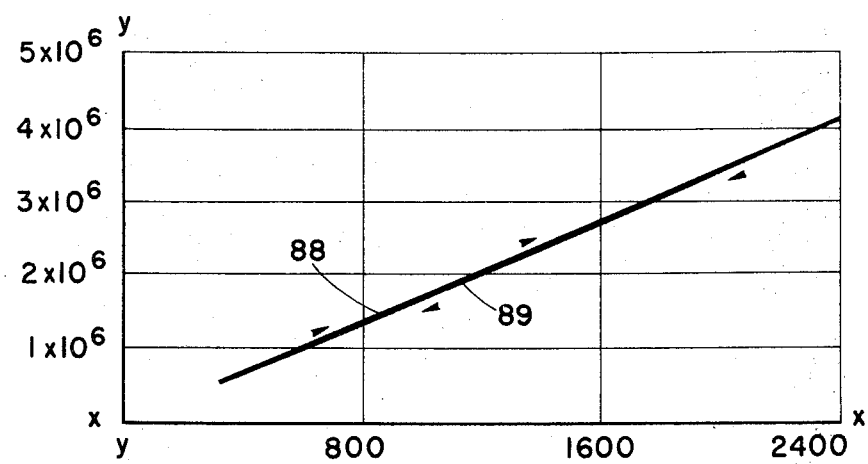
FIG. 17 is a graphic illustration of the minimal hysteresis achieved by the load cell of this invention.

FIG. 17 depicts graphically the minimal hysteresis which is achieved by the load cell of this invention. In this view the Y axis represents the load to which a cell is subjected. The X axis depicts the variation of strains caused by the load. The full line 88 represents strain as the load increases and line 89 represents strain as the load is relieved. Thus the cell, under repeated cycles of operations affords readings that the substantially repeatable and of a high degree of accuracy as is evident in the following table showing load, strain and time for curve FIG. 17.

| Load | Strain | Time |
| --- | --- | --- |
| 0801000 | 00458 | 14:52:10 |
| 1000000 | 00572 | 14:52:51 |
| 1200000 | 00686 | 14:53:30 |
| 1400000 | 00802 | 14:54:16 |
| 2002000 | 01150 | 14:55:10 |
| 3000000 | 01724 | 14:56:10 |
| 4000000 max | 02296 | 14:57:16 |
| 3001000 | 01730 | 14:58:40 |
| 2000000 | 01154 | 14:59:38 |
| 1401000 | 00810 | 15:00:19 |
| 1200000 | 00696 | 15:00:49 |
| 1000000 | 00580 | 15:01:24 |
| 0801000 | 00466 | 15:01:58 |

In order to protect the gauges from impurities and foreign matter the chambers 61 and 62 are filled with an inert gas. Before the gas is introduced into the chambers they are flushed. FIG. 18 shows the band 3 as formed with an opening which receives a nipple 90 with an hermetic seal. This nipple may be first used to flush out the chambers after which the inert gas is charged into the chambers. The end of the nipple is then closed as indicated at 91.

FIG. 19 discloses a schematic circuit diagram in which bridge 92 has opposed arms C defined by vertical strain gauge sensing devices 93 and opposed arms N defined by unstressed strain gauge sensing devices 94 including balance and zero drift compensating resistors (not shown) and supported on unstrained floating plate 95 of FIG. 11. Thus output signals from terminals 96, 97 is obtained responsive to vertical strain compensated for environmental conditions. In the elementary diagram of FIG. 19 bridge 92 is shown connected to a battery source of power 98.

A prior art tangential arrangement of tension sensing gauges renders same fully responsive to hysteresis derived from friction effects. While decoupling of bending moment effects as described herein renders hysteresis effects negligible on readings taken with vertical compression gauges it is contemplated according to the invention that full compensation may be made for hysteresis of tangential strain detection by utilizing in known circuit technique a compensating electrical signal responsive to the difference between the vertical strain gauge signal and the tangential gauge signal as a function of hysteresis and subtracting same from the bridge or detector circuit output signal.

The form of decoupling examplified by FIG. 4 is utilized in circumstances where the total height of the load cell is required to be a minimum otherwise the form of FIG. 6 is generally to be preferred and in which the grooves 44 and 43 need not be symmetrical so long as the neck portion 42 is sufficiently small in section relative thereto as to absorb bending stresses due to misalignment under load, misalignments of loading may unduly stress the annular band portions of the cell structure. Accordingly such annular bands when made of metal and especially when made of stainless steel will preferably embody flexing portions (not shown) in the form of undulations or corrugations.

What is claimed is:

1. In a load cell of the annular ring type: a column having a sensing region; a load pad at each end of said column; and a decoupling portion of said column joining each end of said sensing region to a load pad, each of said decoupling portions being distributed in its mass to compensate for bending moments in the sensing region and providing thereby, equal vertical strains at the inner and outer surfaces of the sensing region responsive to compressive loading on said pads.

2. The load cell of claim 1 in which the decoupling portions are substantial continuations of the sensing region and provide an inwardly bowed column subject to a bending moment under applied load forces and which moment is opposed by the bending moment derived from mass displacement due to the Poisson effect.

3. The load cell of claim 1 in which the mass distribution of the decoupling portions places the greater mass radially outwardly of the radial location of the sensing region.

4. The load cell of claim 1 and a hinge portion of reduced section connecting at least one of said decoupling regions to its associated pad and defined by at least one annular groove to absorb misalignment of loading.

5. The load cell of claim 1 and vertical compression strain gauges on both inner and outer surfaces of said sensing region.

6. The load cell of claim 5 and vertical compression gauges on said sensing region combined solely with unstrained gauges associated therewith and a bridge type transducer electrical circuit containing said gauges.

7. In a load cell including an annular column; a ring shaped load pad integrally joined to each end of said column and having inner and outer cylindrical surfaces disposed on opposite sides of said column with each surface on one pad in alignment with the corresponding surface on the other pad; and strain gauges carried by said column on opposite sides thereof: an annular band having edge portions disposed about each pair of aligned cylindrical surfaces; and a connection between each edge portion and the corresponding cylindrical surfaces defined by at least a pair of annular spaced ridges having cross ribs extending therebetween on said surface, said ridges and ribs being fastened to the band by a joining material providing an hermetic seal for both surfaces of said column.

8. The load cell of claim 7 in which there are three ridges and the cross ribs between one pair of ridges are staggered with relation to the cross ribs of the other pair.

References Cited

UNITED STATES PATENTS

| | | | |
| --- | --- | --- | --- |
| 2,796,503 | 6/1957 | Ward | 73—141 XR |
| 3,277,704 | 10/1966 | Eckard | 73—141 |
| 3,389,432 | 6/1968 | Griesheimer et al. | 73—94 XR |
| 3,422,671 | 1/1969 | Elenbo | 73—141 |
| 3,132,547 | 5/1964 | Doyle et al. | 73—141 |

FOREIGN PATENTS 790,057   2/1958   Great Britain.

OTHER REFERENCES

German printed application: L20726 IX, August 1956, copy in 73–141.

German printed application: 1,050,571, February 1959, copy in 73–141.

CHARLES A. RUEHL, Primary Examiner